No. 664,260. Patented Dec. 18, 1900.
T. GAUNT.
MANUFACTURE OF STARCH.
(Application filed Sept. 29, 1897.)
(No Model.) 4 Sheets—Sheet 1.
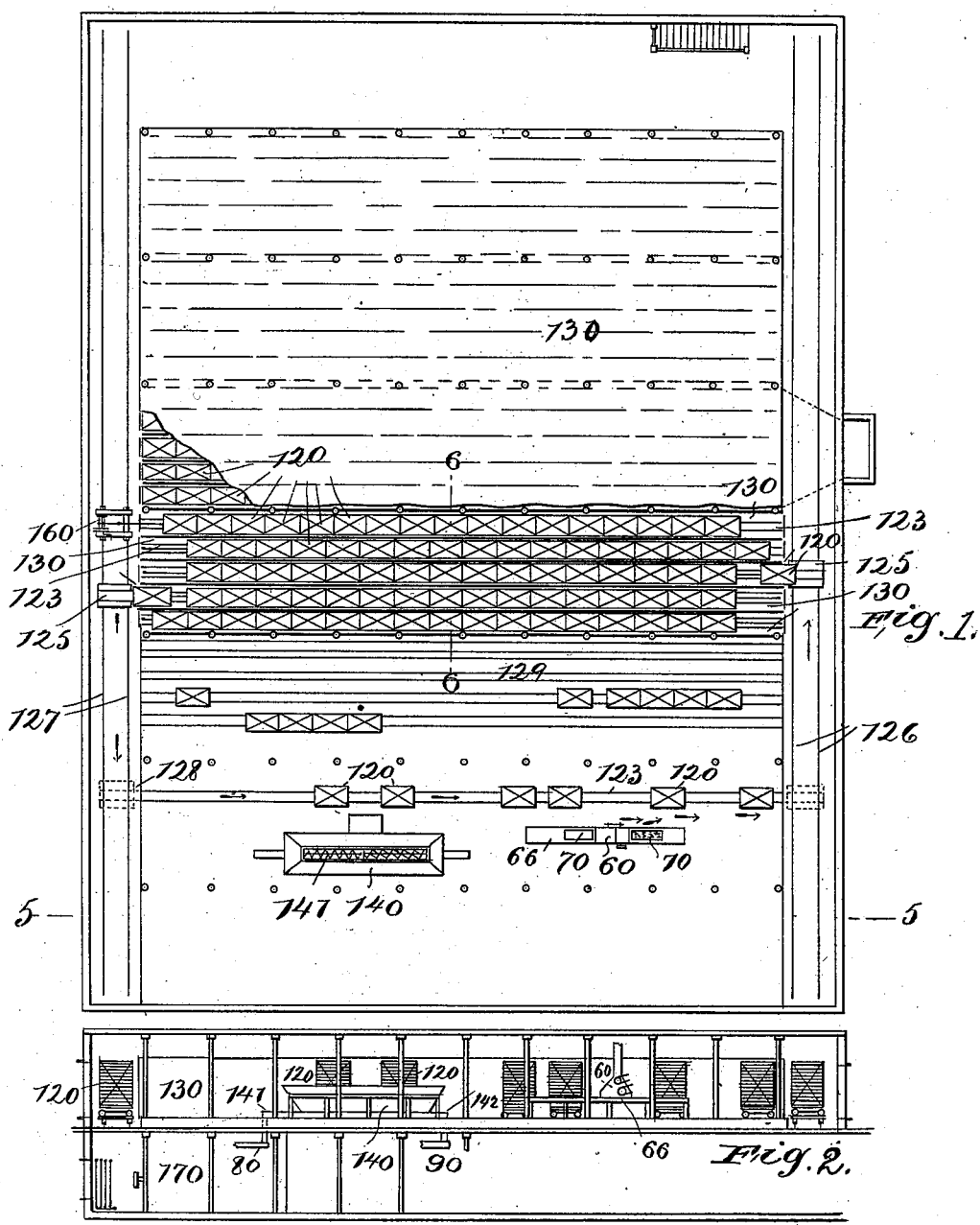

No. 664,260. Patented Dec. 18, 1900.
T. GAUNT.
MANUFACTURE OF STARCH.
(Application filed Sept. 29, 1897.)
(No Model.) 4 Sheets—Sheet 2.
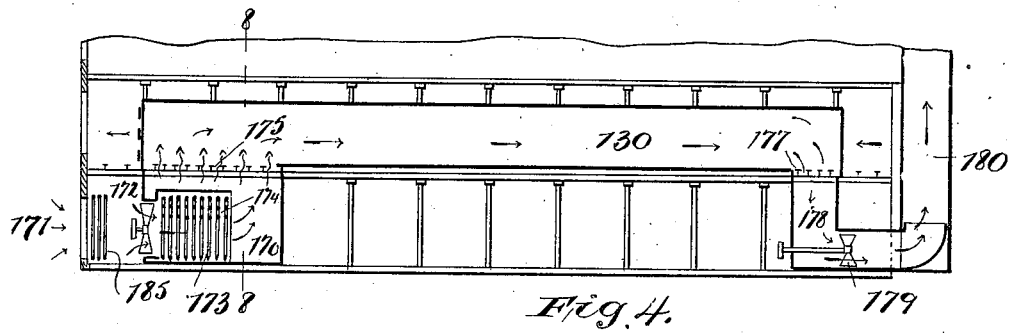
Fig. 4.
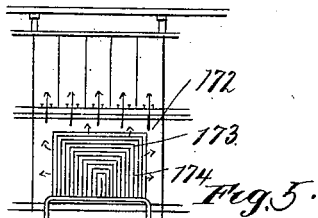
Fig. 5.
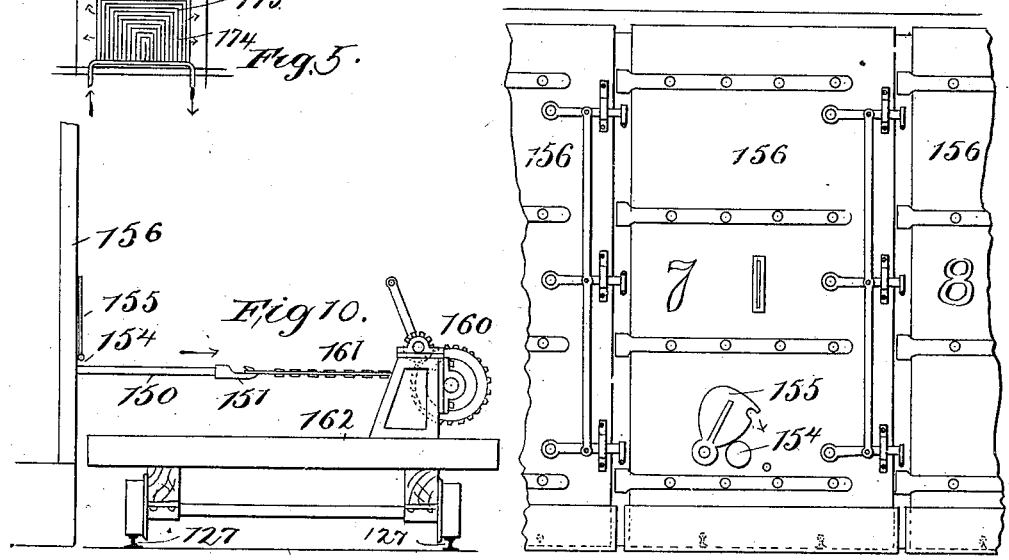
Fig. 10.
Fig. 6.
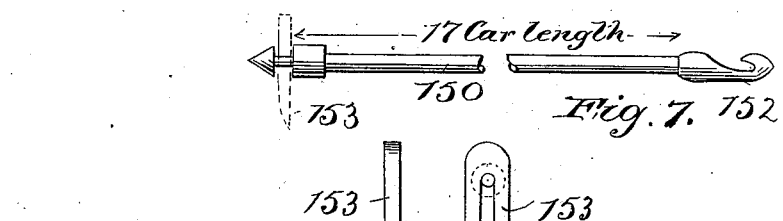
Fig. 7. Fig. 8. Fig. 9.
Attest,
C. W. Benjamin
S. B. Kuhn
Inventor
Thomas Gaunt
By Chas. W. Whitney
Atty.
THE NORRIS PETERS CO., PHOTO-LITHO., WASHINGTON, D. C.

No. 664,260. Patented Dec. 18, 1900.
T. GAUNT.
MANUFACTURE OF STARCH.
(Application filed Sept. 29, 1897.)
(No Model.) 4 Sheets—Sheet 3.
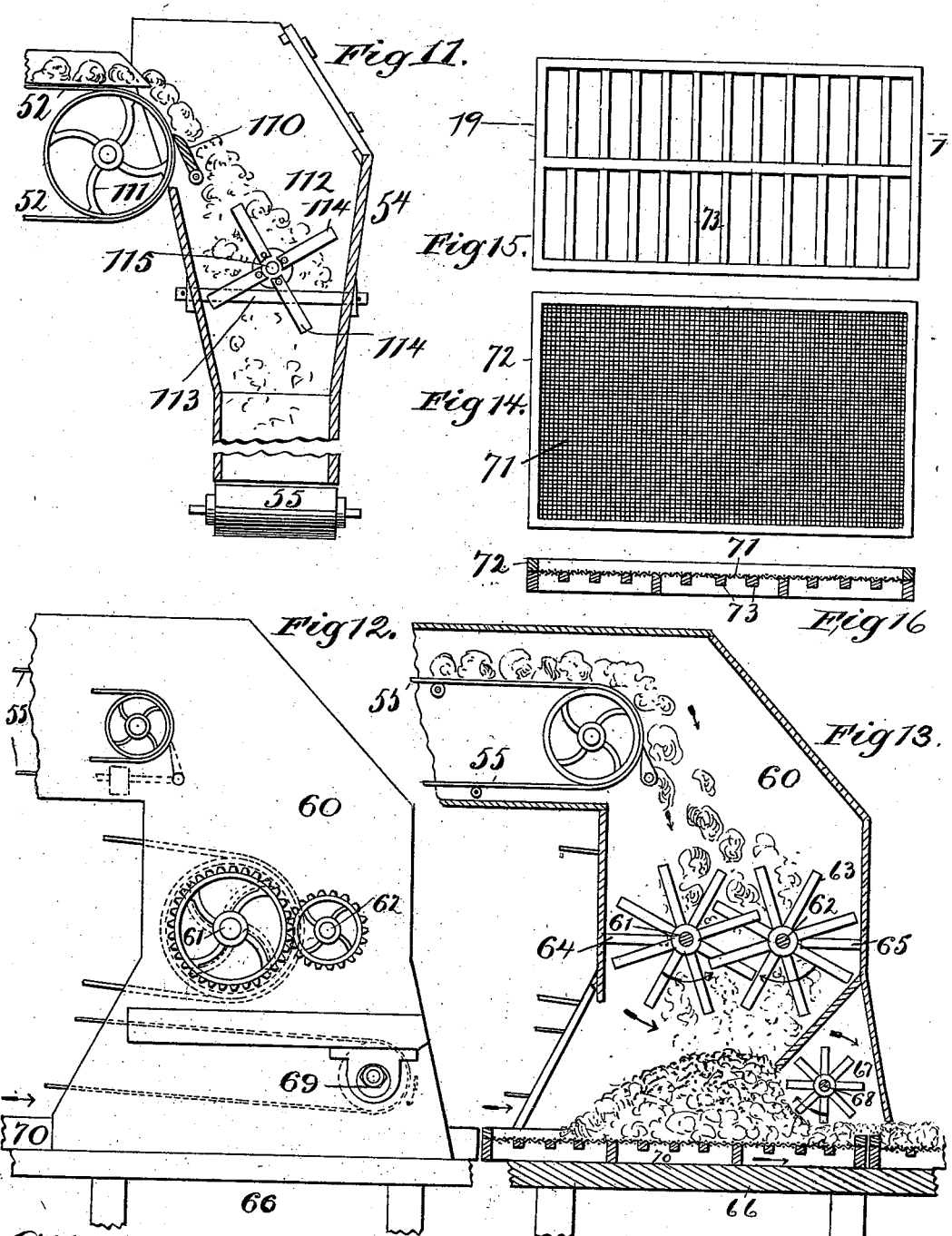

No. 664,260. Patented Dec. 18, 1900.
T. GAUNT.
MANUFACTURE OF STARCH.
(Application filed Sept. 29, 1897.)
(No Model.) 4 Sheets—Sheet 4.

Attest
C. W. Benjamin
D. B. Kuhn

Inventor,
Thomas Gaunt
By Harold M. Pinney
Atty

UNITED STATES PATENT OFFICE.

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

MANUFACTURE OF STARCH.

SPECIFICATION forming part of Letters Patent No. 664,260, dated December 18, 1900.

Application filed September 29, 1897. Serial No. 653,453. (No model.)

*To all whom it may concern:*

Be it known that I, THOMAS GAUNT, of Peoria, Illinois, have invented certain new and useful Improvements in Apparatus for Drying Starch and Similar Substances, of which the following is a description, referring to the accompanying drawings, which form a part of this specification.

My invention relates to apparatus for drying starch and similar substances, and has for its objects certain improvements in the construction and operation of apparatus of this character, as will be hereinafter more definitely pointed out in the specification and set forth in the claims.

Figure 17:
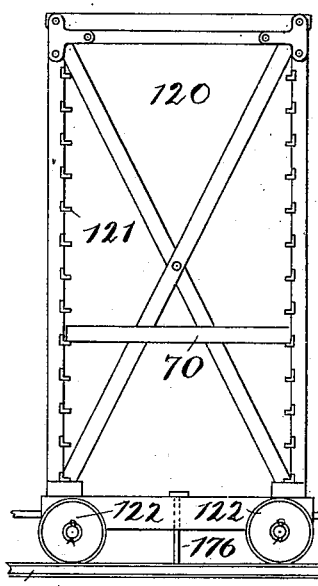
Figure 18:
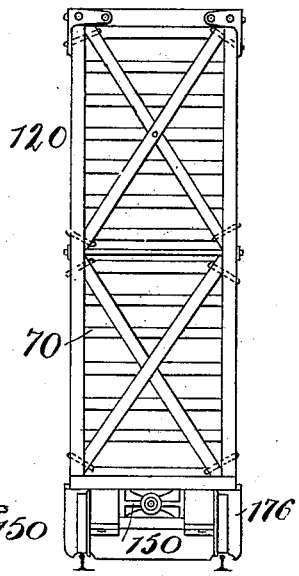
Figure 21:
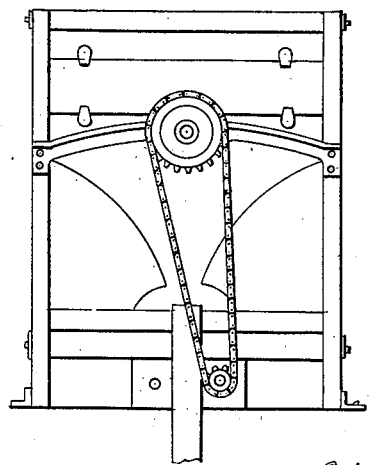
Figure 19:
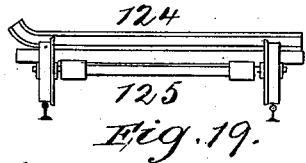
Figure 20:
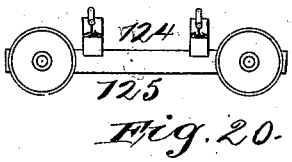
Figure 22:
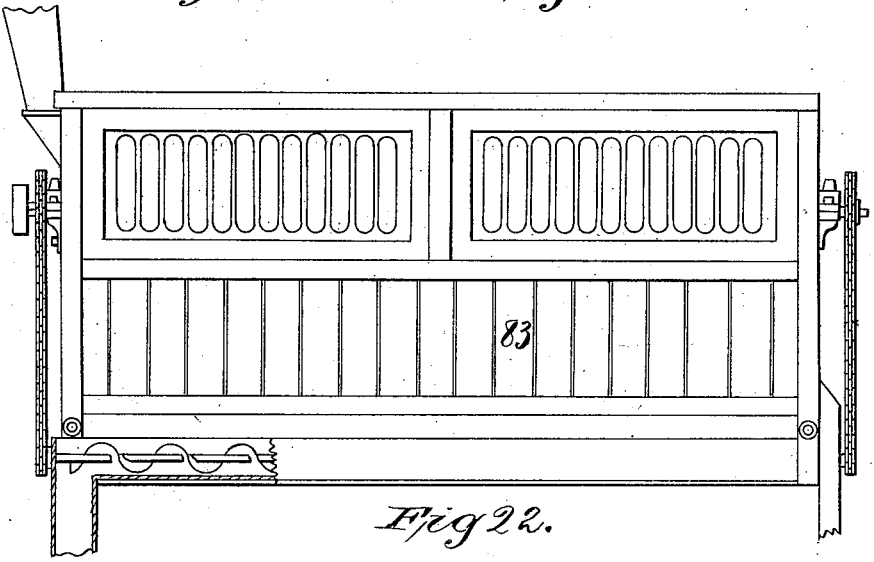

In the accompanying drawings, Figure 1 is a plan view of the floor of a building containing drying-kilns and certain other apparatus for drying starch. Fig. 2 is a vertical section showing two stories of the building cut at the plane 5 5 of Fig. 1. Fig. 3 is a transverse section through a portion of some of the drying-kilns on the plane 6 6 of Fig. 1. Fig. 4 is a longitudinal section through one of the kilns, showing the means of heating and moving the air through the kiln. Fig. 5 is a cross-section of Fig. 4 on the plane 8 8, looking toward the left. Fig. 6 shows one door and a portion of adjacent doors at the rear end of the kilns. Fig. 7 shows the draw-bar for advancing the cars through the kiln. Figs. 8 and 9 are a side view and a front view of the coupling-piece by which the bar is held to the last car in the kiln. Fig. 10 shows the device for drawing the bar shown in Fig. 7, and thereby advancing all the cars in the kiln. Fig. 11 shows a breaker for breaking the wet starch. Figs. 12 and 13 are a side view and section of a spreading mechanism for distributing the wet starch evenly over the starch-trays. Figs. 14, 15, and 16 are respectively a top, bottom, and longitudinal section of one of the starch-trays. Figs. 17 and 18 are side and end views of the starch-car or starch-wagon for holding a number of the trays during the drawing process, one of the trays being shown in the car. Figs. 19 and 20 are end and side views of a transfer-car or transfer-platform for the starch-cars. Figs. 21 and 22 are end and side elevations of a bolting-reel for the dried starch.

Throughout the drawings like figures of reference indicate like parts.

The starch is thrown from the end of the conveying-belt 52 into the descending chute of the breaker 54. A scraper 110 cleans the starch from the conveying-belt 52 as it passes around its pulley 111. Extending horizontally across chute 112 is a series of flat bars 113, set edgewise and forming a grating between which revolve the blades 114, turning on the shaft 115. The revolving blades 114 cut up the starch and force it through between fixed plates 113 in small pieces. The starch so reduced to small pieces is received on a conveying-belt 55 and carried to the spreading mechanism 60, Figs. 12 and 13. From the end of the conveying-belt 55 the starch falls into the casing of spreading mechanism 60. Within the casing are mounted two rotating shafts 61 62, driven in any desirable manner—such, for instance, like that shown in Fig. 12—and rotating in the directions indicated by the arrows in Fig. 13. These shafts are provided with blades or bars 63 and turning in the direction indicated by the arrows. They to a large extent retard or prevent the starch from falling through between them and serve also to break it up into small pieces. Stationary bars 64 and 65 project from the walls of the casing toward the shafts 61 and 62 and retard the starch in passing through between them. The combined effect of the two sets of moving and fixed arms or bars 63, 64, and 65 is to further break up the starch, to prevent its getting in masses, and to cause it to fall at a very even rate, notwithstanding irregularities in the supply from the conveying-belt 55. I will therefore term this part of the mechanism the "regulating" mechanism, since the plates regulate the supply of starch. The bottom of the casing 60 rests upon a table or platform 66, and the starch-trays 70 are pushed along the table 66 one after the other and are filled quickly and evenly while moving by means of the supplying mechanism 60. In Figs. 12 and 13 the trays 70 are shown in position while being filled. As the trays are shoved to the right, as indicated by the small arrows, the starch falling from the said regulating-arms upon the starch-trays is spread out evenly upon the trays by means of the rotating arms, blades, or bars 67, mounted on the shaft 68. The shaft 68 may turn in adjustable bearings 69. I have shown these adjustable bearings consisting of an eccentric which carries the shaft 68. By turning the eccentric the shaft may be lowered slightly and the thickness of the layer of broken starch which the arms 67 will spread upon the tray 70 is thereby adjusted at will. The trays are pushed into the spreading mechanism one after another along the table 66, which may have suitable guides for the purpose, and as the filled trays come out from the rear side of the spreading mechanism they are taken and loaded into the starch-cars and then run into the drying-kilns. The details of the starch-trays are shown in Figs. 14, 15, and 16. Netting of coarse fabric 71 is secured in the frame 72 upon the wooden grating or cross-bars 73. (See Fig. 15, which shows the under side of the tray, and Fig. 16, which shows a cross-section.) A number of these trays are carried by each starch-wagon or starch-car 120. The starch-car shown holds fifteen starch-trays, a series of shells 121 being provided for that purpose. I have shown one tray 70 in position. The starch-wagons 120 are mounted on flanged wheels 122, which run on tracks 123. Transfer-cars 125, having short lengths of rails 124, corresponding to the rails 123, are used for transferring the cars 120 from one track to another. The cars 125 run on tracks which extend at right angles to the tracks for the cars 120. The cars 120, loaded with the damp starch, are run into drying-kilns 130, each of which may hold conveniently as many as twenty cars in a train on a single track. The portion of the kiln which contains the cars virtually forms a tunnel the walls of which just clear the sides and corners of the starch-cars as they are advanced in the tunnel. In Fig. 1 five trains of cars are shown in five tunnel-like kilns, the tops of these five kilns being removed to show the cars. In Fig. 3 the cars are shown in the end view in the kilns. In Fig. 4 the complete longitudinal section of a single kiln is shown.

Referring to Figs. 1, 2, 3, 4, and 5, I will now describe the construction and arrangement of the kilns.

In the drawings I have indicated twenty kilns or ovens arranged side by side, each of which kilns is capable of holding eighteen of the starch-cars arranged in a train. As the kilns are used, however, only seventeen cars are in them at one time, as will be presently explained. The twenty kilns are provided with twenty tracks 123, extending lengthwise through them. The starch-cars are run into and out of the kilns by means of the transfer-cars 125. When the apparatus is arranged as shown in Figs. 4, 5, and 6, the transfer-cars 125 run upon tracks 126 and 127, which are on a lower level than tracks 123, so as to bring the short lengths of rail 124 of the cars 125 exactly into line with any one of the tracks 123 at will. The location of the starch-spreading mechanism 60 for filling the starch-trays is indicated in Figs. 1 and 2. One track 123 outside the kilns runs conveniently near this mechanism, so that when the starch-trays are taken from the table 66 they may be loaded onto a car 120 standing on this track. The car is then run to the right, as shown by the arrows, and taken by a transfer-car 125 along the track 126 to one of the ovens. The order in which the cars are introduced into and withdrawn from the ovens or kilns will be presently described. The starch-cars which have completed the drying process in the kilns are taken out from time to time on transfer-cars 125 on the track 127 and brought to the point 128, so that the cars may be run onto the same track 123 from which they started. Conveniently near this track is a mechanical conveyer 140, which preferably consists of two oppositely-twisted Archimedean screws 141, which carry the material in opposite directions from the center. The men take the dry starch in the trays from the starch-cars 120 and empty the starch into one end or the other of the mechanical conveyers 141, according to whether pearl-starch or powdered starch is desired. One of the two Archimedean screws 141 carries the starch to one point for making pearl-starch, while the other screw 141 delivers to another point for making powdered starch.

The starch-drying process forms a continuous process in which by means of the arrangements shown in Figs. 1, 2, 3, 4, and 5 three hundred and forty cars arranged seventeen in each kiln and each containing fifteen starch-trays, making over five thousand in all, may be constantly under the drying action. The starch-cars are introduced one at a time at the receiving ends of the kilns and at short intervals—say a minute apart. The kilns are for convenience numbered "1" to "20," inclusive, and the successive cars are introduced into successive kilns in regular rotation. If, for instance, the cars are introduced at a minute apart, each kiln will receive a car every twenty minutes, and assuming that the kiln normally contains seventeen cars and that the cars are taken out in rotation in the same manner as that in which they are introduced it is clear that each car will remain in its kiln about three hundred and forty minutes, or nearly six hours. By increasing the number of kilns or the number of cars in each kiln or by lengthening the intervals at which cars are introduced the duration of the drying action to which each car is subjected will be increased, and by reducing these respective factors the time will be decreased.

The seventeen cars in each kiln are drawn forward simultaneously the length of one car from time to time, so that another car may be introduced into the receiving end of the kiln. Preferably just before a car is introduced into the receiving end of the kiln a car containing the dry starch is withdrawn from the delivering end, and just after the fresh car is introduced the whole seventeen cars are advanced forward one car length. The manner in which this is done is as follows: The rod or bar 150 passes through all the cars in a kiln through a suitable casting 151 in each car, as shown in the drawings, Figs. 17 and 18, the bar being shown in Fig. 7. This bar is provided with a hook 152 at the forward end and a coupling-fork 153, (see Figs. 8 and 9,) which fits upon its rear end and prevents its being drawn through the casting 151 in the rear car. In the door toward which the cars move in each kiln is an opening 154, closed by a slide or cover 155. (See Figs. 6 and 10.) When it is time to advance a train of cars, a hand-winch 160 and chain 161, mounted on a car 162, which travels on track 127, (see Figs. 1 and 10,) is brought opposite the closed door of the kiln in which the cars are to be drawn forward. The cover 155 is then withdrawn from the opening 154 and the end of the chain 161 connected to hook 151 on the bar 150. By turning the winch 160 the chain 161 draws the rod 150, as indicated by the arrow in Fig. 13, and moves forward the seventeen or other number of cars one car length in the kiln, the forward car being drawn up against the inside of the door. After releasing the chain 161 the operator then pushes the bar 150 as far back as it will go and closes the slide or cover 155. Thus it will be seen that the cars are drawn forward without opening the kiln, and I will later explain the means by which when the cover 155 is open the exclusion of cold air from the hole 154 is assured. When the cars have been drawn forward by the bar 150 and the bar shoved back, it will be seen that room is provided for another car at the receiving end, (in the figures right-hand end of the kiln.) The carman at that end accordingly in due time runs a starch-car by means of the transfer platform or car 125 on the tracks 126 opposite the kiln and opening the door at the rear end of the train, which it will be seen is the front end of the kiln, lifts the coupling piece or fork 153 from the end of the bar or rod 150, and then rolls the car into the kiln, the rear end of the rod 150 passing freely through the casting 151 in the car as the car is moved into place. The carman then drops the coupling-fork 153 back on the end of the bar 150, and the additional car is thus coupled onto the bar and made part of the train, ready to be advanced with the other sixteen cars in due time by means of the winch, as already described.

Fig. 6 shows my preferred construction of the kiln-doors. The opening 150 and its cover 155 are only present on the rear doors of the kilns—that is to say, the doors toward which the cars move.

I will now describe my preferred manner or, as I may term it, "schedule system of introducing and advancing the cars through the kiln."

Assuming for convenience that there are twenty kilns and room for eighteen cars in each kiln, as shown in Fig. 3, there are normally seventeen cars in each kiln, and it will be seen that if the cars are introduced a minute apart successively throughout all the kilns each car will be in about three hundred and forty minutes, or six hours. This time may be varied according to the dryness of the atmosphere and according to the temperature of the air used for drying. The carman who introduces the cars into the front or receding end of the kilns may set the time for the others and may introduce the cars a minute apart in rotation through the twenty kilns. In Fig. 1 one car is shown being introduced into the eighteenth kiln from the top of the figure. At the other end the operator of the winch 160 follows close upon the man that introduces the cars and as soon as the car has been introduced he connects his winch and draws that train of cars forward, advancing the train one car length. Just preceding him and timing the operation by the winchman is the man that withdraws the cars from the kilns. It is necessary that he should withdraw one car from the kiln before the winchman attempts to move the train of cars forward. This will be apparent from Fig. 1, in which at the left side of the figure the winch 160 is shown in position drawing the train forward, while three kilns in front of the winch a car is being run from the nineteenth kiln onto the transfer-car 125, ready to be run to the position indicated at 128, so that the starch-car may be drawn to the discharging-hopper 140 and conveyer 141.

I will now describe the means of heating the air and forcing it through the kilns.

When there are twenty kilns, I preferably have about four or five heating-chambers beneath them, so that each hot-air chamber furnishes the hot air for about five kilns. This is the arrangement which I have illustrated in the drawings. The ends of the kilns, toward which the cars move, and which are at the left-hand of the figures, are open directly beneath the tracks on which the cars run into the heating-chamber 170. In warm weather the air may be admitted into these heating-chambers directly from the outside of the building through the opening 171. Each of the hot-air chambers 170 is provided with a fan or blower 172, by which a forced draft is delivered directly through the steam heating-pipes 173. These steam-heated pipes are preferably arranged as shown clearly in the figures and inclosed by the sheet-metal casing 174, open at the inner end and forming at the other end a continuation of the casing of the blower. The air driven by the blower through the steam-pipes 173 comes from the inner end of the casing 174 against the rear wall of the chamber 170 and is thence deflected upward, passing back over the casing 174 and up through the grating 175 in the floor of the five or other number of kilns 130, supplied from chamber 170. The grating 175 may consist of short I-beams or channel-bars supporting the rails on which the cars travel and leaving great freedom for the passage of the hot air. The hot air from the chamber 170 passes through the whole length of each kiln 130 in a reverse direction to that in which the cars are introduced and moved through the kilns. The cars, being designed to very nearly fit the kilns 130, as indicated in Fig. 6, compel the hot air to flow directly through the cars over each of the starch-trays 70, so as to get the greatest effect for a given amount of hot dry air. To prevent the ready passage of the air beneath the car-bodies and between the wheels, I provide the wooden air deflectors or plates 176, Figs. 17 and 18, upon each car. The hot air, passing over the starch-trays in successive cars from the dryest starch toward the freshly-introduced damp starch at the front or right-hand end of the kiln, passes down at the forward end of the kiln, where the starch-cars are received through the grating 177 into the passage 178, which connects in common with all the kilns in the series. From this passage 178 the hot air, now greatly cooled and nearly saturated with dampness from the starch, is exhausted by the fan or blower 179 and passes out through the chimney 180. This exhaust-air, being warmer than the surrounding atmosphere and containing water-vapor, in ascending the chimney 180 tends to create considerable additional draft. When the weather is cold, the air instead of being admitted directly to the blower 172 and heating-pipes 173 first passes through the heating-pipes 185 in front of the opening 171. In cold weather, therefore, the pipes 185 are used; but in warm dry weather it is not necessary to use them. I guard against the introduction of cold air into the kilns when the doors are opened to introduce or withdraw the starch-cars by producing at all times within the kilns an air-pressure slightly in excess of the atmospheric pressure, so that wherever the kilns are open the heated air escapes to a limited extent from the open kiln without affording access to the outside air. This result may be accomplished by merely retarding the exhaust from the kilns; but in practice I produce it and prefer to produce it by running the introducing-blowers 172 and the exhaust-blower 179 at definite and determined speeds, such that the introducing-blowers tend to introduce two or three per cent. more air than the exhaust-blower 179 is set to exhaust. By this means there is always a slight excess of pressure within the kilns above that of the surrounding air. When one of the kiln-doors is open at the end from which the cars are withdrawn, this effect is evidenced by an outflow of the heated air, and the same is true when the receiving-doors of the kilns are open to admit the starch-cars. When one of the bars 150 is drawn by the winch 160 to advance the train of cars, the escape of hot air through the opening 154, which very nearly fits the bar 150, is negligible.

It will be seen that the several technical effects and the apparatus for producing them which I have described may be variously modified, principally in regard to the detail of the apparatus, without departing from the principles of my invention.

Having fully described the preferred forms of apparatus embodying my invention, I claim as the essential features, and desire to secure by these Letters Patent, the following:

1. In combination in spreading and evening apparatus, a table or support for the trays, mechanical spreading mechanism mounted above the said support or table, and means for adjusting the height of the said mechanism relatively to the said table to increase or decrease the thickness of material to be spread, substantially as set forth.

2. In combination with a support or guideway for moving starch-trays, mechanical spreading mechanism acting upon the starch upon such moving trays, and an eccentric mounting for the said spreading mechanism, adjustable to raise and lower it, substantially as set forth.

3. The car or wagon provided with wheels 122, and means for receiving and loosely supporting without securing the longitudinally-extending bar 150, substantially as and for the purposes set forth.

4. As means for advancing the series of cars and coupling on successive cars at the rear, a bar 150, openings in the said cars through which the said bar extends, and a coupling-piece removably secured to the rear end of the said car and of size sufficient to prevent its being drawn through the said cars, substantially as set forth.

5. In combination with a hopper 140, a screw conveyer having two reversely-inclined portions 141 acting in opposite directions to convey material from the said hopper, whereby the material may be transmitted in either of two directions at will, substantially as set forth.

In witness whereof I have hereunto set my hand this 19th day of August, 1897.

THOMAS GAUNT.

Witnesses:
 CARRIE M. GILL,
 FRANK R. CUSHING.